United States Patent
Gatherer et al.

(10) Patent No.: US 6,954,505 B2
(45) Date of Patent: Oct. 11, 2005

(54) DISCRETE MULTITONE MODULATION WITH REDUCED PEAK-TO-AVERAGE RATIO USING UNLOADED SUBCHANNELS

(75) Inventors: Alan Gatherer, Richardson, TX (US); Michael O. Polley, Garland, TX (US); Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 752 days.

(21) Appl. No.: 10/034,951

(22) Filed: Dec. 27, 2001

(65) Prior Publication Data

US 2002/0176509 A1 Nov. 28, 2002

Related U.S. Application Data

(60) Provisional application No. 60/280,793, filed on Apr. 2, 2001, and provisional application No. 60/279,830, filed on Mar. 29, 2001.

(51) Int. Cl.[7] ................................................. H04B 1/10
(52) U.S. Cl. ....................... 375/260; 375/295; 375/222
(58) Field of Search ................................ 375/260, 222, 375/295

(56) References Cited

U.S. PATENT DOCUMENTS 6,240,141 B1 * 5/2001 Long ........................... 375/260
6,366,555 B1 * 4/2002 Gatherer et al. ............ 370/210

FOREIGN PATENT DOCUMENTS

EP 0 957 615 A2 11/1999

OTHER PUBLICATIONS

Gatherer, et al., "Controlling Clipping Probability in DMT Transmission", *Proceedings of the Asilomar Conference on Signals, Systems, and Computers* (IEEE, 1997), pp. 578–584.

* cited by examiner

*Primary Examiner*—Stephen Chin
*Assistant Examiner*—Jaison Joseph
(74) *Attorney, Agent, or Firm*—Abdul Zindani; W. James Brady, III; Frederick J. Telecky, Jr.

(57) ABSTRACT

A transceiver (100) such as used in Discrete Multitone (DMT) modulation of digital signals for communication, such as in a DSL modem communications system, is described. The transceiver (100) includes a function (119) by way of which unloaded subchannels are encoded with a clip prevention signal. The clip prevention signal is derived to avoid clipping by an amplifier (18) after modulation into the time domain, upsampling, and filtering. The effects of the upsampling and filtering are considered in deriving the clip prevention signal, by considering the upsampling and filtering as a polyphase combination, and using the filter response for each phase. Frequency domain and time domain update alternatives are disclosed.

24 Claims, 5 Drawing Sheets

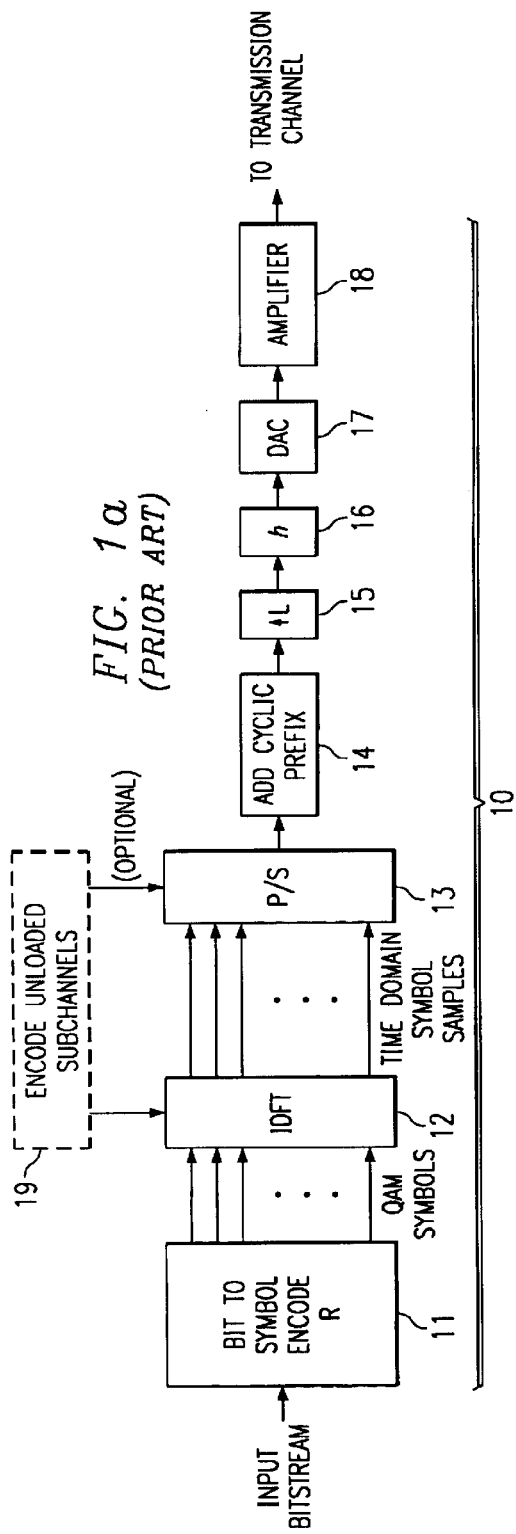
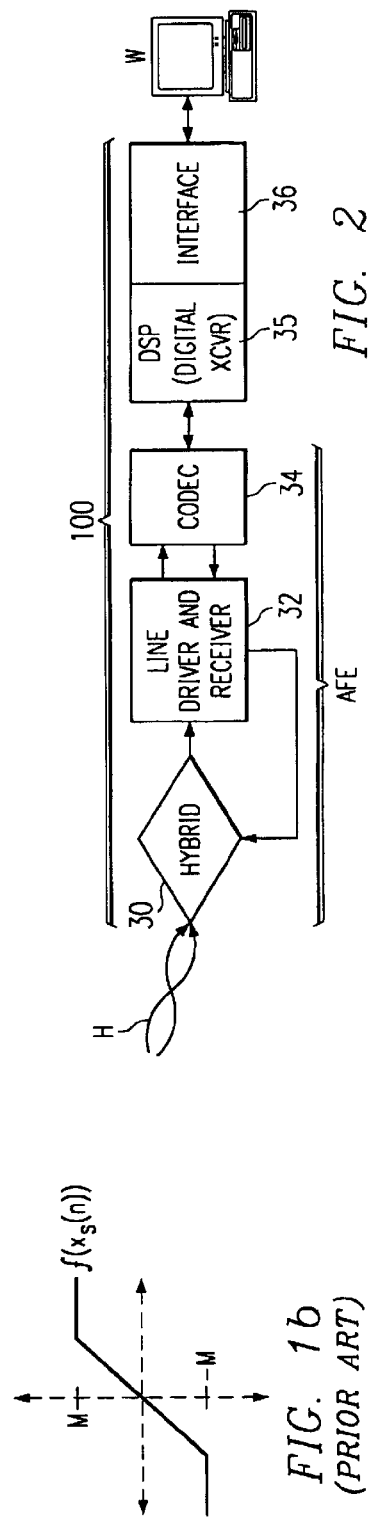

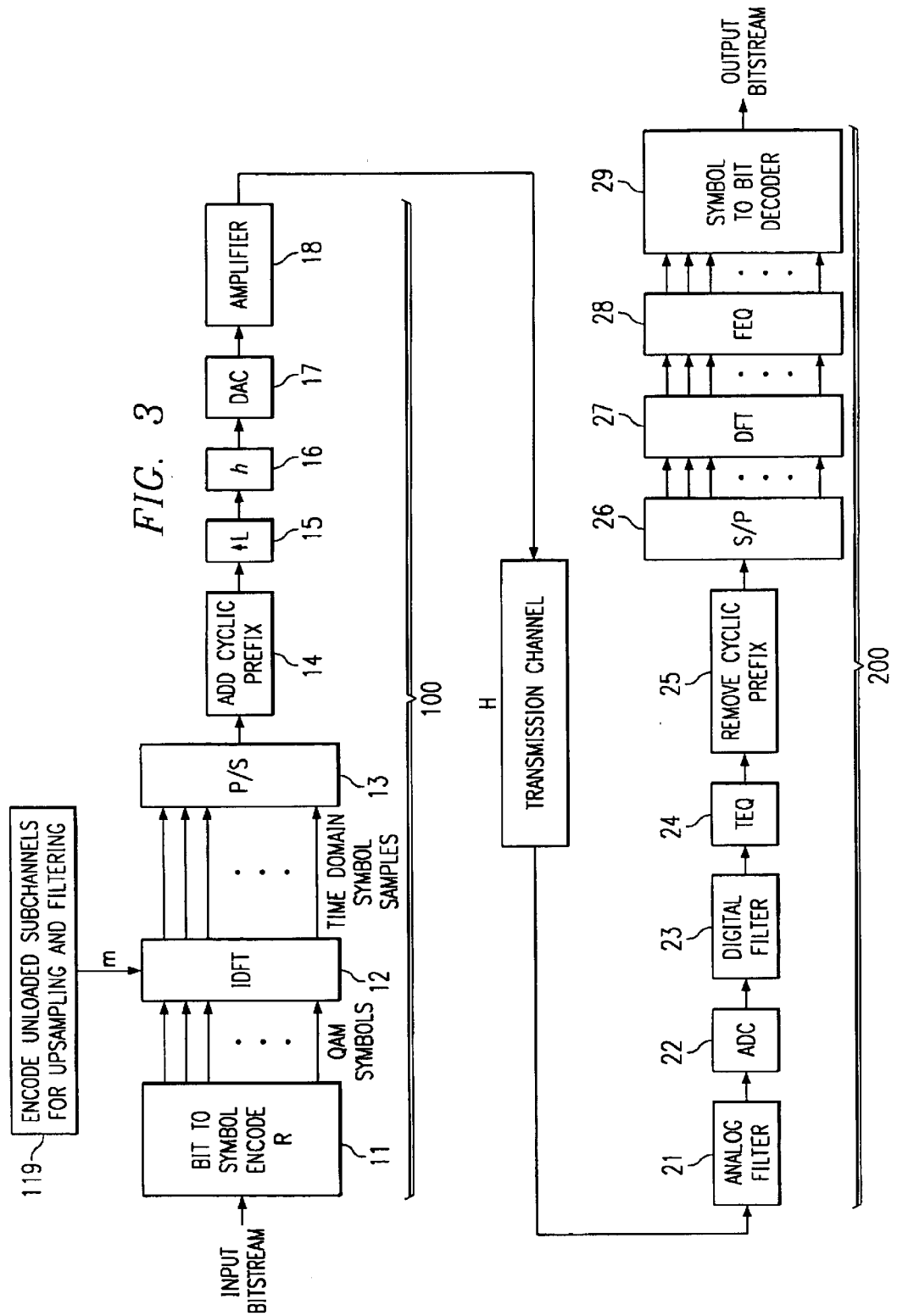

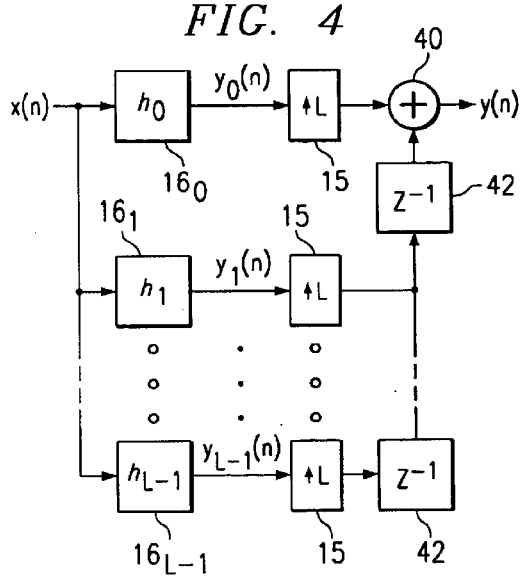
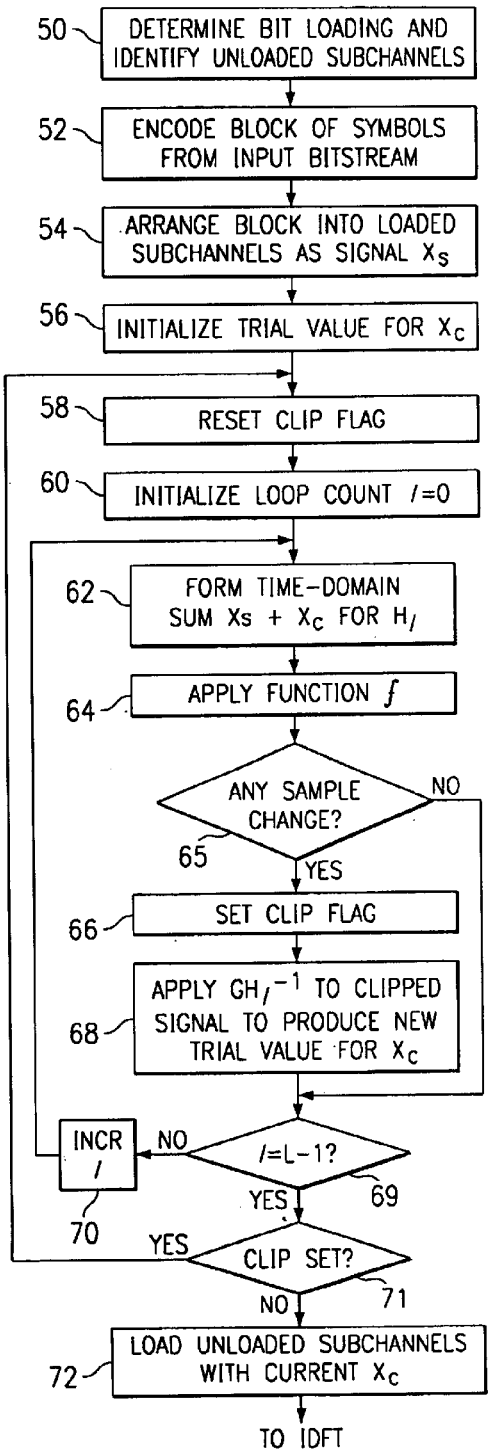

DISCRETE MULTITONE MODULATION WITH REDUCED PEAK-TO-AVERAGE RATIO USING UNLOADED SUBCHANNELS

CROSS-REFERENCE TO RELATED APPLICATIONS

This application claims priority, under 35 U.S.C. §119(e), of provisional application No. 60/280,793, filed Apr. 2, 2001, and of provisional application No. 60/279,830, filed Mar. 29, 2001.

STATEMENT REGARDING FEDERALLY SPONSORED RESEARCH OR DEVELOPMENT

Not applicable.

BACKGROUND OF THE INVENTION

This invention is in the field of digital communications, and is more specifically directed to Digital Subscriber Line (DSL) communications.

An important and now popular modulation standard for DSL communication is Discrete Multitone (DMT). According to DMT technology, the available spectrum is subdivided into many subchannels (e.g., 256 subchannels of 4.3125 kHz). Each subchannel is centered about a carrier frequency that is phase and amplitude modulated, typically by Quadrature Amplitude Modulation (QAM), in which each symbol value is represented by a point in the complex plane; the number of available symbol values depends, of course, on the number of bits in each symbol. During initialization of a DMT communications session, the number of bits per symbol for each subchannel (i.e., the "bit loading") is determined according to the noise currently present in the transmission channel at each subchannel frequency and according to the transmit signal attenuation at that frequency. For example, relatively noise-free subchannels may communicate data in ten-bit to fifteen-bit symbols corresponding to a relatively dense QAM constellation (with short distances between points in the constellation), while noisy channels may be limited to only two or three bits per symbol (to allow a greater distance between adjacent points in the QAM constellation). Indeed, some subchannels may not be loaded with any bits, because of the noise and attenuation in those channels. In this way, DMT maximizes the data rate for each subchannel for a given noise condition, permitting high speed access to be carried out even over relatively noisy twisted-pair lines.

DMT modulation also permits much of the processing of the data to be carried out in the digital domain. Typically, the incoming bitstream is serially received and then arranged into symbols, one for each subchannel (depending on the bit loading). Reed-Solomon coding and other coding techniques are also typically applied for error detection and correction. Modulation of the subchannel carriers is obtained by application of an inverse Discrete Fourier Transform (IDFT) to the encoded symbols, producing the output modulated time domain signal. This modulated signal is then serially transmitted. All of these operations in DMT modulation can be carried out in the digital domain, permitting implementation of much of a DSL modem, and particularly much of the processing-intensive operations, in a single chip (such as a Digital Signal Processor, or DSP).

The discrete output time domain signal from the modulation is then converted into a time-domain analog signal by a conventional digital-to-analog converter. The analog signal is then communicated over the transmission channel to the receiving modem, which reverses the process to recover the transmitted data. The non-ideal impulse response of the transmission channel of course distorts the transmitted signal. Accordingly, the signal received by the receiving modem will be a convolution of the analog output waveform with the impulse response of the transmission channel. Ideally, the DMT subchannels in the received signal are orthogonal so that the modulating data can be retrieved from the transmitted signal by a Discrete Fourier Transform (DFT) demodulation, under the assumption that convolution in the time domain corresponds to multiplication in the frequency domain.

While DMT provides excellent transmission data rates over modest communications facilities such as twisted-pair wires, the IDFT modulation can result in a high peak-to-average ratio (PAR) of the signal amplitudes. The PAR is defined as the ratio of the peak power level, for a sample, to the average power level over a sequence of samples. In the case of conventional DMT modulation, the amplitude of the time domain signal from the IDFT has a probability distribution function that has substantially a Gaussian shape. This Gaussian distribution of the signal amplitudes indicates the possibility that some time-domain samples may have amplitudes that are very high, as compared with the average sample amplitude. The resulting PAR is therefore much higher for DMT signals than for single-channel signals, because of the probability that the additive DMT peaks can overlay one another to result in an extremely large amplitude time-domain sample.

The high PAR for conventional DMT signals presents significant constraints on the transmission circuitry, and can greatly complicate the analog circuitry required for high fidelity transmission. For example, a high PAR translates into a large dynamic range at the inputs of digital-to-analog and analog-to-digital converters, necessitating a large number of bits of resolution, and the associated extreme cost and complexity. Filters and amplifiers must also become more complex and costly in order to handle both the high peak amplitudes and also the resolution required for the vast majority of the samples having lower amplitude. In addition, the high PAR results in much higher power consumption in the communications circuits, further increasing the cost of the circuits and systems used for DMT transmission and receipt, particularly those circuits often referred to as the analog front end (AFE).

A common approach to controlling the PAR in DMT transmission is to clip amplitudes that exceed a selected threshold. This clipping obviously results in loss of signal. Clipping effectively introduces an impulse at the clipped sample in the time domain signal, having the negative of the amplitude being clipped. As known in the art, a time-domain impulse corresponds to additive noise across all subchannels in the frequency domain, and thus clipping effectively reduces the signal-to-noise ratio for all subchannels in the modulated signal. In addition, the use of clipping requires a difficult tradeoff. Clipping to a relatively low amplitude threshold reduces circuit complexity and power dissipation, but greatly increases the probability of clipping; on the other hand, clipping at a high amplitude threshold decreases the probability of clipping but increases circuit complexity and cost. If the average power of the signal is kept small, so that the peak amplitude remains within the dynamic range of the analog circuitry, the signal amplifiers are operating in an inefficient operating state; conversely, the amplifier efficiency can be improved by raising the average power only by increasing the probability of clipping.

Various approaches have thus been developed to reduce the PAR of DMT signals to minimize the number of samples that require clipping. According to one class of techniques, DMT symbols are coded so that the resulting code words reside in the set of DMT symbols that reside below the desired PAR amplitude threshold. These techniques necessitate a loss of data rate, because of the coding overhead that results.

Another approach effects an invertible transformation on the transmitted signal, such as a phase rotation for certain subchannels, to reduce the probability that the PAR amplitude threshold is exceeded. Assuming the probability of the original signal exceeding the PAR threshold to be low, the probability that both the original signal and also the transformed signal will exceed the threshold will be approximately the square of the low probability for the original signal, which greatly reduces the extent of clipping. In this approach, a control signal is communicated to the receiver to identify the transformation, so that the receiver can apply the inverting transformation, as necessary, and recover the original signal.

Another approach estimates and corrects the effects of clipping at the receiver. As described in European Patent Application publication EP 0957 615 A2, published Nov. 17, 1999 and incorporated by this reference, an estimate of the clipping error is generated at the receiver, and is used to reconstruct a frequency domain compensation signal that is applied to the received signal, to remove the effects of any clipping.

A method of reducing the PAR in DMT transmissions without involving a loss of data rate is described in Gatherer and Polley, "Controlling clipping probability in DMT transmission", *Proceedings of the Asilomar Conference on Signals, Systems, and Computers*, (1997), pp. 578–584, incorporated herein by this reference. As noted above, one function carried out in the training sequence on initiation of a DSL session determines the number of bits per symbol (i.e., the bit loading) assigned to each subchannel. After bit loading, it is common for a number of subchannels (typically at higher frequencies) to remain unloaded, carrying no data symbols at all. In the Gatherer and Polley article, the PAR is reduced by using these unloaded subchannels to carry a "signal" that contains no payload, but that has the effect of reducing the amplitude of the time domain signal to below the PAR amplitude threshold, in most cases.

In summary, the Gatherer and Polley method performs an iterative process to derive the symbols for the unloaded subchannels. In short, an initial trial value (possibly zero) of the unloaded subchannel signal is added, in the time-domain, to the time-domain signal after the IDFT. A nonlinear function corresponding to the clipping amplifier is applied to the summed signal; if no clipping results (i.e., if none of the signal elements change), the current trial value of the unloaded subchannel signal is kept as part of the signal. If, on the other hand, the nonlinear clipping amplifier function indicates clipping, the clipping is used to determine a new trial signal for the unloaded subchannels, and the process repeated until clipping does not occur.

Referring now to FIG. 1a, an example of transmission of a DMT signal over a DSL communication system according to the Gatherer and Polley article will now be described. Transmitting modem 10 receives an input bitstream that is to be transmitted to a receiving modem over a transmission channel. This input bitstream is a serial stream of binary digits, in the appropriate format as produced by the data source, and is received by bit-to-symbol encoder 11 in transmitting modem 10. Encoder 11 groups the bits in the input bitstream into multiple-bit symbols that are used to modulate the DMT subchannels. The number of bits in each subchannel varies according to the bit loading assigned to each subchannel in the initialization of the communication session, as known in the art. In addition, encoder 11 may also use error correction coding, such as Reed-Solomon coding, for error detection and correction purposes; other types of coding, such as trellis, turbo, or LDPC coding, may also be applied for additional signal-to-noise ratio improvement. The symbols generated by encoder 11 are typically complex symbols, including both amplitude and phase information, and correspond to points in the appropriate modulation constellation (e.g., quadrature amplitude modulation, or QAM).

The encoded symbols are then applied to inverse Discrete Fourier Transform (IDFT) (also referred to as inverse Fast Fourier Transform (IFFT)), function 12. IDFT function 12 associates each input symbol with one subchannel in the transmission frequency band, and generates a corresponding number of time domain symbol samples according to the Fourier transform. These time domain symbol samples are then converted into a serial stream of samples by parallel-to-serial converter 13. Functions 11 through 13 thus convert the input digital bitstream into a serial sequence of symbol values representative of the sum of a number of modulated subchannel carrier frequencies, the modulation indicative of the various data values. Typically, N/2 unique complex symbols (and its N/2 conjugate symmetric symbols) in the frequency domain will be transformed by IDFT function 12 into a block of N real-valued time domain samples.

As known in the art, function 14 adds a cyclic prefix to each block of serial samples presented by parallel-to-serial converter 13, by copying a selected number of sample values from the end of the block, and prepending the copy to the beginning of the block. The cyclic prefix has the effect of limiting intersymbol interference (ISI) due to energy from a previous symbol spreading into the next symbol due to the channel response. The cyclic prefix causes the datastream to appear to be periodic over a block of N of the N+P samples, where P is the length of the prefix, so that the equivalence between frequency domain multiplication and time-domain convolution is valid.

Upsampling function 15, and digital filter 16, then process the digital datastream in the conventional manner. As known in the art, upsampling function doubles or quadruples (or applies any multiple) the datastream to increase the sample rate, by inserting zero-value samples between each actual signal sample. Digital filter 16 may include such operations as a digital low pass filter for removing image components, and digital high pass filtering to eliminate POTS-band or ISDN interference. The digitally-filtered datastream signal is then converted into the analog domain, by digital-to-analog converter 17. Analog filtering (not shown) may then be performed on the output analog signal, such filtering typically including at least a low-pass filter. The analog signal is then amplified by amplifier 18 which, according to this embodiment of the invention, includes a clipping function, such as a hardlimiting clipping function that limits the amplitude to a maximum (both positive and negative polarities). As described in U.S. Pat. No. 6,226,322, digital-to-analog converter 17, amplifier 18, and any analog filtering, may be implemented in coder/decoder (codec) integrated circuit in transmitting modem 10 (FIG. 2).

The amplified analog output is then applied to a transmission channel, for forwarding to a receiving modem. According to conventional ADSL technology, the transmission channel consists of some length of conventional twisted-pair wires. In general, the receiving modem (not shown) reverses the processes performed by transmitting modem 10 to recover the input bitstream as the transmitted communication.

An example of the hardlimiting clipping function applied by amplifier 18 in his conventional transmission system is illustrated in FIG. 1b. Considering the input to amplifier 18 as sampled analog signal $x_s(n)$, amplifier 18 generates an output signal corresponding to the function $f(x_s(n))$, as shown in FIG. 1b. This function $f(x_s(n))$ can effectively be expressed as:

$$f(x_s(n)) = \begin{cases} -M, & \text{for } Bx_s(n) < -M \\ Bx_s(n), & \text{for } |Bx_s(n)| < M \\ M, & \text{for } Bx_s(n) > -M \end{cases}$$

where B is the gain of amplifier 18, and where M is the maximum output magnitude of amplifier 18, as shown in FIG. 1b. As discussed above, each time the amplitude of a sample of signal $x_s(n)$ exceeds the clipping threshold $|Bx_s(n)|$, data may be lost from the payload signal; alternatively, if the average power is held to be low enough to effectively avoid clipping, amplifier 18 will not be operating efficiently, and resolution in the transmitted signal will also be compromised.

According to the Gatherer and Polley method, unloaded channel encoding function 19 generates symbols that are assigned to unloaded subchannels in order to reduce the likelihood of clipping, by reducing the peak-to-average ratio (PAR) of the transmitted signal. A clip prevention signal $X_c$ can be derived that is orthogonal to frequency-domain payload signal $X_s$, by assigning clip prevention signal $X_c$ to subchannels where payload signal $X_s$ is zero. An indicator matrix G can thus be derived as a diagonal matrix with ones corresponding to unloaded subchannels, and zeroes elsewhere. This indicator matrix G will thus have the properties:

$GX_s=0$ $GX_c=X_c$ indicating that signals $X_c$ and $X_s$ are orthogonal to one another.

To reduce the peak amplitude of payload $X_s$ after IDFT and D/A conversion, clip prevention signal $X_c$ is selected to maintain payload signal $X_s$ below the clipping threshold:

$f(x_s+x_c)-(x_s+x_c)=0$ in the time domain, where $x_s=F^H X_s$, $F^H$ being the inverse DFT operator (and F being the DFT operator). In the frequency domain, one may rewrite this relationship as:

$f(F^H X_s+F^H X_c)-(F^H X_s+F^H X_c)=0$

One may readily solve for clip prevention signal $X_c$ in the frequency domain by:

$X_c=Ff(F^H X_s+F^H X_c)-X_s$.

The orthogonality constraint between payload signal $X_s$ and clip prevention signal $X_c$ is enforced using the indicator matrix G:

$$X_c = GX_c = GFf(F^H X_s + F^H X_c) - GX_s$$
$$= GFf(F^H X_s + F^H X_c)$$

According to the Gatherer and Polley article, the clip prevention signal $X_c$ is solved for using the Projection Onto Convex Sets (POCS) method. For example, an iterative method can be used to solve for the clip prevention signal $X_c$ 1. Start with an initial trial value for clip prevention signal $X_c$ (e.g., $X_c=0$);
2. Form the time domain signal $x_s+x_c=F^H X_s+F^H X_c$;
3. Apply the nonlinear clipping function to the time domain signal $x_s+x_c$ and determine whether any elements change (i.e., are clipped). If not, the current trial value of clip prevention signal $X_c$ is adequate.
4. If clipping occurred, perform a DFT of the clipped time domain signal $x_s+x_c$ and form a new trial value for clip prevention signal $X_c$, using the above equation including the indicator function, and repeat the process.

An alternative approach, according to the Gatherer and Polley method, is to perform the step of forming a new trial value for the clip prevention signal $x_s$ in the time domain, using a vector of precomputed values and no additional transforms. This is accomplished by performing an IDFT of the expression for the clip prevention signal $X_c$, and then precalculating a shaping matrix $S=F^H GF$ that is applied to the clips of the clipped time domain signal $x_s+x_c$ to be added to the prior trial value of clip prevention signal $x_c$ to produce the next trial value. The shaping matrix need only be calculated once for a given indicator matrix G, and the time domain transform $x_s=F^H X_s$ need only be performed once, according to this time-domain update approach. In this approach, the resulting time-domain clip prevention signal $x_c$ is added in after IDFT function 12, as shown in FIG. 1a.

A particular benefit of the Gatherer and Polley method is that the receiver need not transform the signal, and that no data rate is lost. The modifying signal is applied by the transmitter only affects unloaded subchannels, and thus is not considered by the receiver in demodulating the transmitted signal. Indeed, the payload portion in the loaded subchannels are not modified in any way.

BRIEF SUMMARY OF THE INVENTION

It is an object of this invention to provide a method and system for reducing the peak-to-average ratio (PAR) of a discrete multitone (DMT) modulated signal in an improved manner.

It is a further object of this invention to provide such a method and system in which the effects of upsampling and filtering are accounted for in reducing the PAR.

It is a further object of this invention to provide such a method in which the PAR reduction can be efficiently accomplished by the execution of a software routine by programmable logic, such as a digital signal processor (DSP).

Other objects and advantages of the present invention will be apparent to those of ordinary skill in the art having reference to the following specification together with its drawings.

The present invention may be implemented by an iterative approach executed in the transmitter loop of a DMT communications system, such as a DSL modem, in which upsampling and filtering is applied after Inverse Discrete Fourier Transform (IDFT) modulation of the payload symbols. Subchannels are identified that, in the training process, were loaded with no symbols. An initial trial value of an orthogonal clip prevention signal is selected; the initial value may be zero, and the clip prevention signal is orthogonal in the sense that it is applied to the unloaded subchannels. A clip flag is reset, and a time domain sum signal is produced by performing the IDFT of the payload signal and the trial value of the clip prevention signal, for the first phase of the polyphase filter corresponding to the upsampling and filter, and summing the results. A nonlinearity corresponding to the clipping threshold is applied to the summed signal, and the result is examined to determine if any clipping resulted; if so, the clip flag is set. A new estimate for the clip prevention signal is then generated, and the IDFT and nonlinear clipping function is applied for the next phase of the polyphase filter. Upon completing the process for each phase of the polyphase filter, the clip flag is interrogated. If set, the process is repeated; if not, the most recent trial value of the clip prevention signal is maintained as its most recent trial value, and is transmitted in the unloaded channels along with the DMT modulated payload.

BRIEF DESCRIPTION OF THE SEVERAL VIEWS OF THE DRAWING

FIG. 1a is a functional block diagram of the functions involved in transmission of a DMT modulated signal, according to the prior art.

FIG. 1b is a transfer characteristic of a conventional clipping amplifier.

FIG. 2 is an electrical diagram, in block form, of a transceiver constructed according to the preferred embodiments of the invention.

FIG. 3 is a functional block diagram of communications between two DMT transceivers, where at least the transmitting transceiver is constructed according to a first preferred embodiment of the invention.

FIG. 4 is a polyphase representation of the operation of the upsampling and filtering operations performed in the transmitting transceiver according to the preferred embodiments of the invention.

FIG. 5 is a flow diagram illustrating the operation of a first preferred embodiment of the invention in generating a clip prevention signal.

DETAILED DESCRIPTION OF THE INVENTION

Figure 6:
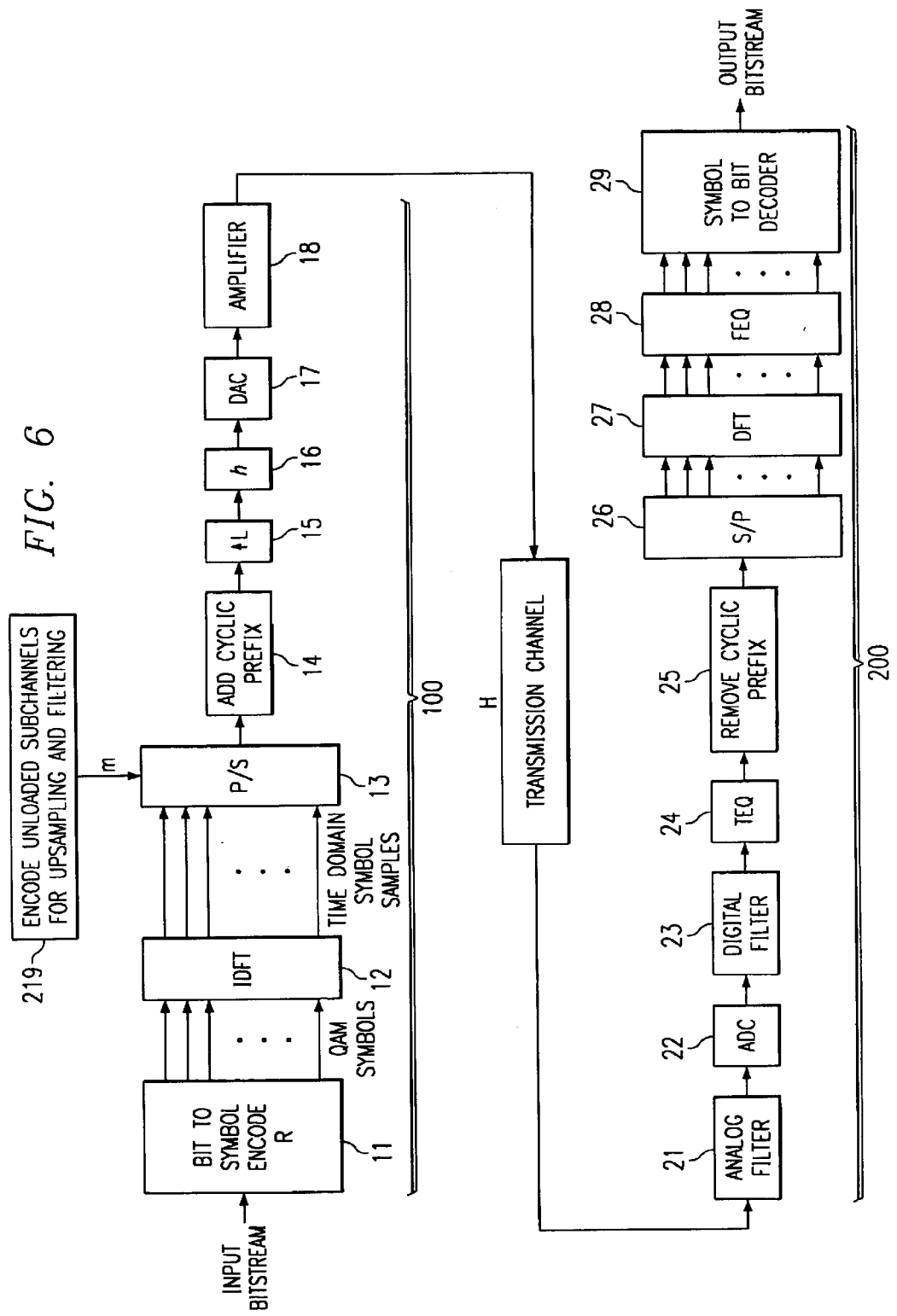
FIG. 6 is a functional block diagram of communications between two DMT transceivers, where at least the transmitting transceiver is constructed according to a second preferred embodiment of the invention.

The present invention will be described in connection with an example of its implementation in a communications transceiver, such as a Digital Subscriber Line (DSL) modem. It will be apparent to those skilled in the art having reference to this specification that this invention is particularly well-suited for use in such an application. However, it is also contemplated that this invention will be of similar benefit in many other applications that involve multicarrier modulation. It is therefore to be understood that these and other alternatives to the embodiment described below are contemplated to be within the scope of the invention as claimed.

Referring now to FIG. 2, the construction of DSL modem 100, in the form of a transceiver (i.e., for both transmitting and receiving) and constructed according to the preferred embodiments of the invention, will be described. The particular architecture illustrated in FIG. 2 is presented by way of example, as those skilled in the art having reference to this specification will readily appreciate that this invention may be implemented into DSL modems of other architectures, and also into other communications devices for transmitting DMT modulated signals. In particular, while particular functions will be described as being performed by certain integrated circuit devices in this description of modem 100, it will be appreciated by those skilled in the art that alternative arrangements of the particular integrated circuits within modem 100 may be used in connection with this invention, for example by integrating more functions to within a fewer number of integrated circuits. In addition, modem 100 may correspond to one port of a central office modem, which may of course carry out simultaneous transmissions with many client modems, or alternatively modem 100 may correspond to a client modem for communicating with a single central office for DSL access.

As shown in FIG. 2, modem 100 includes hybrid circuit 30, which is connected to twisted-pair transmission channel H. Hybrid circuit 30 is a conventional circuit that converts the two-wire arrangement of twisted-pair facility H to dedicated transmit and receive lines connected to line driver and receiver 32, considering that modem 100 is suitable for carrying out both the receipt and the transmission of DMT modulated communications. Line driver and receiver 32 is a high-speed line driver and receiver for driving and receiving ADSL signals over twisted-pair facility H; an example of a suitable line driver and receiver circuit is the THS7102 line driver/receiver available from Texas Instruments Incorporated. Line driver and receiver 32 is bidirectionally coupled to coder/decoder (codec) circuit 34, which carries out analog and digital filtering, and analog-to-digital conversion. An example of a suitable codec device may be selected from the TLV320AD1x device family available from Texas Instruments Incorporated. Hybrid circuit 30, line driver and receiver 32, and codec 34 are often referred to, in the aggregate, as an "analog front end".

Modem 100 also includes DSP 35, which serves as a digital transceiver for DSL communications. As noted above, DSP 35 is a high performance digital signal processor, for carrying out the digital operations of the present invention as will be described below; exemplary devices suitable for use as DSP 35 include the TMS320C6x family of DSPs available from Texas Instruments Incorporated. For the example in which modem 100 is a client modem, conventional interface 36 couples DSP 35 in the usual manner to a data source, which in this example is client workstation W; alternatively, if modem 100 is implemented at a central office, the data source would be the appropriate communications network or switch at the central office.

FIG. 3 functionally illustrates an example of a DSL communication system into which the preferred embodiment of the invention is implemented. The same reference numerals will be used in FIG. 3 for the same functions performed in conventional modem 10 as described above relative to FIG. 1. In the system of FIG. 3, only one direction of transmission (from transmitting modem 100 to receiving modem 200) is illustrated; it will of course be understood by those skilled in the art that data will also be communicated in the opposite direction (from modem 200 to modem 100). According to this embodiment of the invention, the DSL communications carried out in the system of FIG. 3 are of the asymmetric DSL (ADSL) type. In this arrangement, so-called "downstream" communication is from the telephone company central office to the subscriber's modem while "upstream" communication is from the subscriber to the central office.

As shown in FIG. 3, transmitting modem 100 receives an input bitstream that is to be transmitted to receiving modem 200. The input bitstream may be generated by a computer at the same location as transmitting modem 100, or alternatively and more likely for the case of a central office modem, is communicated over a computer network, in the Internet sense, that is coupled to transmitting modem 100. The input bitstream is a serial stream of binary digits, in the appropriate format as produced by the data source.

The input bitstream is received by bit-to-symbol encoder 11 in transmitting modem 100. Encoder 11 performs multiple functions in this embodiment. One such function is to group the bits in the input bitstream into multiple-bit symbols, for example ranging up to as many as fifteen bits. The symbols will be the values used to modulate the various subchannels, as will be described below. The symbols typically are not necessarily representative of the transmitted data itself, but instead simply correspond to grouping of the serial bitstream for broadband transmission. The number of bits in each symbol produced by encoder 11 will vary, in this DSL application, according to the bit loading assigned to each subchannel in the initialization of the communication session, as known in the art. In addition, encoder 11 may also use error correction coding, such as Reed-Solomon coding, for error detection and correction purposes; other types of coding, such as trellis, turbo, or LDPC coding, may also be applied for additional signal-to-noise ratio improvement. In addition, the symbols generated by encoder 11 are typically complex symbols, including both amplitude and phase information, and correspond to points in the appropriate modulation constellation (e.g., quadrature amplitude modulation, or QAM).

The encoded symbols are then applied to inverse Discrete Fourier Transform (IDFT) (also referred to as inverse Fast Fourier Transform (IFFT)) function 12. IDFT function 12 associates each input symbol with one subchannel in the transmission frequency band, and generates a corresponding number of time domain symbol samples according to the Fourier transform. These time domain symbol samples are then converted into a serial stream of samples by parallel-to-serial converter 13. Functions 11 through 13 thus convert the input digital bitstream into a serial sequence of symbol values representative of the sum of a number of modulated subchannel carrier frequencies, the modulation indicative of the various data values. Typically, N/2 unique complex symbols (and its N/2 conjugate symmetric symbols) in the frequency domain will be transformed by IDFT function 12 into a block of N real-valued time domain samples.

In function 14, a cyclic prefix is then added to each block of samples presented by IDFT function 12 through parallel-to-serial converter 13. The cyclic prefix is constructed by a selected number of sample values at the end of the block, and these values are then prepended to the block by function 14. For example, if each block includes 512 samples, a typical cyclic prefix is on the order of thirty-two samples. The cyclic prefix has the effect of limiting intersymbol interference (ISI) due to energy from a previous symbol spreading into the next symbol due to the channel response; in other words, the cyclic prefix causes the datastream to appear to be periodic, so that the equivalence between frequency domain multiplication and time-domain convolution is valid over N of the N+P samples (P being the number of samples in the prefix). Those skilled in the art having reference to this specification will readily recognize that each of functions 11 through 14 may be carried out, and preferably are carried out, as digital operations. As such, it is contemplated that a high-performance digital integrated circuit, such as a digital signal processor (DSP) having computational power similar to or greater than the TMS320C5x and TMS320C6x DSPs available from Texas Instruments Incorporated will be suitable for these functions.

Upsampling function 15, and digital filter 16, then process the digital datastream in the conventional manner. As known in the art, upsampling function doubles or quadruples (or applies any multiple) the datastream, by inserting zero-valued samples between each signal sample, thus increasing the sample rate. Digital filter 16 may include such operations as a digital low pass filter for removing image components, and digital high pass filtering to eliminate POTS-band or ISDN interference. The digitally-filtered datastream signal is then converted into the analog domain, by digital-to-analog converter 17. Analog filtering (not shown) may then be performed on the output analog signal, such filtering typically including at least a low-pass filter. The analog signal is then amplified by amplifier 18 which, according to this embodiment of the invention, includes a clipping function, such as a hardlimiting clipping function that limits the amplitude to a maximum (both positive and negative polarities). As described in U.S. Pat. No. 6,226,322, digital-to-analog converter 17, amplifier 18, and any analog filtering, may be implemented in coder/decoder (codec) integrated circuit in transmitting modem 100 (FIG. 2).

The amplified analog output is then applied, via the appropriate line driver and other circuitry (not shown in FIG. 2) to transmission channel H, for forwarding to receiving modem 200. According to conventional ADSL technology, the transmission channel consists of some length of conventional twisted-pair wires. The transmission channel H communicates the transmitted analog signal to receiving modem 200, which, in general, reverses the processes performed by transmitting modem 100 to recover the input bitstream as the output bitstream.

As shown in FIG. 3, the functions of modem 200 in processing received downstream communications according to the preferred embodiment of the invention will now be described, according to an example based upon time domain equalization. It is of course understood that the recovery of the payload signal at the receiver may be alternatively carried out according to other techniques; because the present invention does not require any change at the receiver, such alternative receiver approaches may also be used in connection with this invention. In the example of FIG. 3, following physical receipt of the signal through hybrid circuit 30 and line driver and receiver 32 (FIG. 2), analog filtering function 21 is performed by codec 34, primarily to remove high frequency noise and aliasing from the incoming signal; as described in U.S. Pat. No. 6,226,322, commonly assigned herewith and incorporated by this reference, equalization of the analog signal may also be performed to compensate for line attenuation characteristics of transmission channel H. Analog-to-digital conversion process 22 then converts the filtered analog signal into the digital domain, following which conventional digital filtering function 23 is applied to augment the function of the analog filters. Functions 21, 22, and 23 are preferably performed by codec device 34 of FIG. 2, to provide a filtered digital data stream to DSP 35 for digital processing, as will now be described.

Digital filter function 23 forwards the filtered digital datastream to time domain equalizer (TEQ) 24. TEQ 24 is preferably a finite impulse response (FIR) digital filter, implemented as a software routine executed by DSP 35 (of FIG. 2), that is designed to effectively shorten the length of the impulse response of the transmission channel H, including the filtering that is performed prior to receipt by TEQ 24. The design of this TEQ filter is realized by the selection of the particular coefficients of the FIR implementing TEQ function 24 during initialization, or "training" of modem 200 in combination with modem 100 upon establishing a communications session.

Following TEQ 24, the cyclic prefix is removed from each received block in function 25. Serial-to-parallel converter 26 then converts the datastream into a number of samples (2N) for application to Discrete Fourier Transform (DFT) function 27. Because the received datastream applied to DFT function 27 is a time-domain superposition of the modulated subchannels, the DFT of this datastream will recover the modulating symbols at each of the subchannel frequencies, reversing the IDFT performed by function 12 in the transmission processing by transmitting modem 100. The output of DFT function 27 is a frequency domain representation of the transmitted symbols multiplied by the frequency-domain response of the effective transmission channel, under the assumption that the cyclic prefix is at least as long as the (possibly shortened) channel response h(t). Frequency-domain equalization (FEQ) function 28 then divides out the frequency-domain response of the effective channel, recovering the modulating symbols. Symbol-to-bit decoder function 29 then resequences the symbols into a serial bitstream, decoding any encoding that was applied in the transmission of the signal, and producing an output bitstream that corresponds to the input bitstream upon which the transmission was based. This output bitstream is then forwarded to the client workstation, or to the central office network, depending on the location of receiving modem 200.

According to this embodiment of the invention, transmitting modem 100 also includes unloaded subchannel encoding function 119. According to the preferred embodiments of the invention, encoding function 119 effectively inserts symbols into one or more subchannels prior to IDFT 12, corresponding to one or more subchannels that have a bit loading of zero determined in the training routine. As such, the operation of function 119 adds information into the subchannels that are not otherwise loaded with payload data from the input bitstream. According to this preferred embodiment of the invention, however, this information is generated in such a manner as to incorporate the effects of upsampling function 15 and filter 16, as will now be described.

As known in the art, upsampling and filtering as performed by upsampling function 15 and filter 16 in order to increase the sample rate, and eliminate image components and POTS-band or ISDN interference. The unloaded channel encoding described in the Gatherer and Polley article, while generally useful, does not take this upsampling and filtering into account. As a result, time-domain samples that do not exceed the clipping threshold prior to upsampling and filtering, and therefore for which a compensating clip prevention signal $X_c$ would not be generated, may exceed the clipping threshold after upsampling and filtering but without having encoded unloaded subchannels. Because of the effects of upsampling and filtering, the effects of encoding the unloaded subchannels as described in the Gatherer and Polley article are limited in some applications.

The theory of operation of the present invention will now be described, first in connection with filtering in the absence of upsampling, and then in connection with both upsampling and filtering prior to digital-to-analog conversion. The goal of the method according to this invention is to derive a clip prevention signal $X_c$ (in the frequency domain; $x_c$ in the time domain) such that its sum with the payload signal $X_s$ does not clip after digital filter function 16 is applied.

Consider the impulse response of filter function 16 as h (and upsampling function 15 to upsample by a factor of one, in other words adding no samples). In the time domain, the goal of encoding function 119 is to apply a frequency domain clip prevention signal $X_c$ that has a time domain transform $x_c$ for which:

$$f(h*x_s+h*x_c)-(h*x_s+h*x_c)=0$$

where * is the time-domain convolution operator. In the frequency domain:

$$f(F^H H X_s+F^H H X_c)-(F^H H X_s+F^H H X_c)=0$$

where H is a diagonal matrix having non-zero entries corresponding to the DFT of the impulse response h. To the extent that interblock effects from filter function 16 are important, these effects could be handled by saving a previous state of the filter, or by way of a conventional overlap and add or save method. To define the clip prevention signal $X_c$, one may rearrange this frequency domain equation:

$$F^H H X_c = f(F^H H X_s + F^H H X_c) - F^H H X_s$$

and applying the DFT operator F $$H X_c = F f(F^H H X_s + F^H H X_c) - H X_s$$

To isolate clip prevention signal $X_c$, one may multiple by the inverse $H^{-1}$ of the filter response H:

$$X_c = H^{-1} F f(F^H H X_s + F^H H X_c) - X_s$$

Recalling the orthogonality constraint, using indicator matrix G which is a diagonal matrix with ones at the entries having unloaded subchannels:

$$X_c = G X_c$$
$$= G H^{-1} F f(F^H H X_s + F^H H X_c) - G X_s$$

and because $G X_s = 0$ from the orthogonality:

$$X_c = G H^{-1} F f(F^H H X_s + F^H H X_c)$$

This fixed point equation for clip prevention signal $X_c$ can now be solved by way of Projection Onto Convex Sets (POCS). One should note that, because clip prevention signal $X_c$ is multiplied by the filter response H, if this filter response H is small on unloaded subchannels, then the resulting clip prevention signal $X_c$ will likely be ineffective.

Referring to FIG. 3, if one considers the time domain input to upsampling function 15 as signal x(n), and the output of filter function 16 as y(n), with an upsampling factor of L, an equivalent polyphase representation is illustrated in FIG. 4. As shown in FIG. 4, input signal x(n) is effectively applied to L filter functions $16_0$ through $16_{L-1}$, with corresponding filter responses $h_0$ through $h_{L-1}$, with the output of each filter function $16_j$ represented as signal $y_j(n)$. The individual polyphase filters $h_l$ for 1 from 0 to L−1 are related to the original filter response h by:

$$h_l(n)=h(Ln+l)$$

The filtered signals $y_0(n)$ through $y_{L-1}(n)$ are then each upsampled by a factor L by upsampling functions 15. The upsampled outputs are combined into output signal y(n) by adder 40, with the higher order upsampled signals $y_1(n)$ through $y_{L-1}(n)$ delayed by 1 through L−1 delay stages 42. If the individual filter output signals $y_l(n)$ do not clip, the combined output y(n) will not clip. This is because upsampling functions 15 each insert zero-valued samples between each sample of individual output signals $y_l(n)$, and the delay stages 42 delay the multiple paths so that the filtered output signals $y_l(n)$ do not add to one another.

Recalling the fixed-point relationship of clip prevention signal $X_c$:

$$X_c = GH^{-1}Ff(F^H H X_s + F^H H X_c)$$

the polyphase analysis indicates that the upsampling factor L may be incorporated by:

$$X_c = GH_l^{-1}Ff(F^H H_l X_s + F^H H_l X_c)$$

for l=0, 1, . . . , L−1, where $H_l$ is the frequency response of the $l^{th}$ polyphase filter $16_l$. This solution for clip prevention signal $X_c$ thus satisfies the L polyphase equations.

Based on this theory of operation and referring now to FIG. 5, a method of performing encoding function 119, by determining the clip prevention signal $X_c$, according to the preferred embodiment of the invention will now be described in detail. As noted above, encoding function 119 is contemplated to be implemented by way of DSP 36 (FIG. 2), with the method steps shown in FIG. 5 carried out by DSP 36 executing a software routine. Of course, other realizations of function 119 are also contemplated to be within the scope of this invention, such realizations including custom logic, for example in the form of a coprocessor, residing within modem 100.

As shown in FIG. 5, the method begins with process 50, in which the bit loading of the DMT subchannels is determined, and those subchannels receiving no bit loading are identified. It is contemplated that process 50 will be carried out in the initialization of the DSL session, by way of a conventional modem "training" routine; it is also contemplated that the bit loading may be updated periodically during the DSL session, to account for changes in the transmission environment. In any case, certain subchannels within the transmission bandwidth are identified in process 50 as being unloaded, and an indicator matrix G is defined. As noted above, indicator matrix G is a diagonal matrix with ones at the locations corresponding to the unloaded subchannels.

In process 52, DSP 36 encodes a block of symbols from the input bitstream, which may be generated by a computer at the same location as transmitting modem 100, or received over a computer network. As discussed above relative to encoder function 11 of FIG. 3, the input bitstream is a serial stream of binary digits that is grouped, in process 52, into multiple-bit symbols, with the number of bits in each symbol depending on the bit loading determined in process 50. Other processes that may optionally be carried out in connection with process 52 include error detection and correction coding, or trellis, turbo, or LDPC coding. The output of process 52 is contemplated to be sequences of complex symbols, including both amplitude and phase information, and corresponding to points in the modulation constellation for the particular communications class (e.g., quadrature amplitude modulation, or QAM). In process 54, these symbols are associated with subchannels in the transmission band (i.e., those subchannels having non-zero bit loading), and together comprise payload signal $X_s(n)$.

As noted above, the goal of the method of FIG. 5 is to derive clip prevention signal $X_c$ that, when summed with payload signal $X_s$ and converted into the time domain, has amplitude peaks that are within the clipping threshold, including the effects of upsampling and filtering. Because of the iterative nature of this method, process 56 begins by initializing a trial value for clip prevention signal $X_c$; it is contemplated that an initial trial value may be, and perhaps preferably is, zero at all subchannels (including the loaded subchannels). Flag CLIP is reset in process 58, and a loop counter l is initialized to zero. Loop counter l counts the number of passes through the remainder of the method of FIG. 6, and corresponds to a current phase of the polyphase representation of the L phases in FIG. 4.

In process 62, DSP 36 forms a time domain signal from the frequency-domain signal block $X_s$ and the current trial value of clip prevention signal $X_c$. As discussed above, this time-domain signal is based upon a IDFT (or IFFT, as the case may be) of signals $X_s$, $X_c$, contemplating the effects of the current phase of the filter. This time domain signal thus is generated by summing the results of the IDFTs:

$$F^H H_l X_s + F^H H_l X_c$$

Of course, for the trivial case of initial trial clip prevention signal $X_c=0$, the second term of this sum is zero. As before, the $H_l$ term is the frequency response of filter function $16_l$ for the current phase l under investigation. The resulting time domain signal will, of course, be represented by a sequence of sample amplitudes.

In process 64, the amplifier function f is applied to this time domain signal by DSP 36. While it is contemplated that this function f is typically a hardlimiting clipping amplifier as shown in FIG. 1b, the particular function f applied in process 64 may correspond to any linear or nonlinear function (but typically including nonlinearities). Decision 65 is then performed to determine whether any of the samples in the current time domain sum signal is clipped by the application of function f in process 64. If not (decision 65 is NO), decision 69 is then executed to determine whether loop counter l indicates that the final phase has been evaluated. If not (decision 69 is NO), loop counter l is incremented in process 70, and a new time domain sum signal is produced in process 62 and the process repeated for the next phase.

If clipping is detected (decision 65 is YES), flag CLIP is set in process 66 to indicate that a clipped sample has been detected. In process 68, a new trial value of clip prevention signal $X_c$ is generated, by applying the operator $GH_l^{-1}$ to the clipped time domain signal (output by process 64). This operator corresponds to the inverse of the filter response for the current phase, multiplied by the indicator matrix G, and produces a new trial value for clip prevention signal $X_c$, which will be used in the next iterations through the process. Decision 69 is then repeated to determine whether additional phases remain to be analyzed. If so (decision 69 is YES), loop counter l is incremented in process 70, and the process repeated for the next phase using the new trial clip prevention signal $X_c$, beginning from process 62.

Upon decision 69 indicating (with a YES result) that loop counter l has reached its terminal value of L−1 (the value L being the upsampling ratio), decision 71 interrogates flag CLIP. If flag CLIP is set (decision 71 is YES), one of the time-domain signals for one of the phases was clipped, and a new trial value for clip prevention signal $X_c$ is to be generated, for at least one phase within the most recent loop through processes 62 et seq. In this case, control passes to process 58, in which flag CLIP is reset, and to process 60, in which loop counter l is reinitialized to zero, and the process is repeated for the same input signal $X_s$ but with the new trial clip prevention signal $X_c$, beginning with the zeroeth phase.

Once the process has been repeated for all L phases (decision 69 is YES) and with none of the phases having been clipped by application of the function $f$ in process 64 (decision 71 is NO), the current trial value of clip prevention signal $X_c$ can be deemed to be effective in eliminating clipping from the payload signal $X_s$. As described above, this generation of clip prevention signal $X_c$ is performed in a manner that takes into account upsampling function 15 and filter 16. Process 72 is then performed, by way of which DSP 36 loads the current unloaded subchannels with the current clip prevention signal $X_c$. This new signal is then passed to IDFT function 12, and the modulation and transmission of the corresponding modulated signal is carried out.

According to this embodiment of the invention, therefore, the peak to average ratio (PAR) is reduced by the generation of a clip prevention signal, and by the encoding of otherwise unloaded subchannels with that clip prevention signal. Because the clip prevention signal is orthogonal to the payload signal, no loss of data is involved in this PAR reduction. In addition, because the clip prevention signal resides exclusively in unloaded subchannels, the clip prevention signal is completely transparent to receiving modem (e.g., modem 200 in FIG. 3) and involves no processing on the receiver end to determine whether clipping occurred or to compensate for any clipping. Rather, the subchannels carrying the clip prevention signal are simply ignored, because they are unloaded subchannels insofar as the receiver is concerned. This method is also quite computationally efficient, considering that the only somewhat complex step involves the IDFT's used in generating the time domain signal (process 62).

An alternative approach for deriving the clip prevention signal will now be described. As will become apparent from the following description, this approach operates as a time domain update, and is contemplated to be a higher performance method, by using a vector of precomputed values and no additional transforms.

Recalling the expression for clip prevention signal $X_c$:

$$X_c = GH_l^{-1} F f (F^H H_l X_s + F^H H_l X_c)$$

One can multiply both sides of this equation by the filter response $H_l$ for the current phase:

$$H_l X_c = GF f (F^H H_l X_s + F^H H_l X_c)$$
$$= GF f(h_l * x_s + h_l * x_c)$$

The IDFT of both sides of this equation into the time domain provides:

$$h_l * x_c = F^H GF f(h_l * x_s + h_l * x_c)$$

or, defining a shaping function $S = F^H GF$:

$$h_l * x_c = S f(h_l * x_s + h_l * x_c)$$

This can now be rewritten to apply the update of the clip prevention signal by way of applying the shaping function to the clip updating:

$$h_l * x_c = Sf(h_l * x_s + h_l * x_c) + S(h_l * x_s + h_l * x_c) - S(h_l * x_s + h_l * x_c)$$
$$= S(f(h_l * x_s + h_l * x_c) - (h_l * x_s + h_l * x_c)) + S(h_l * x_s + h_l * x_c)$$
$$= S(f(h_l * x_s + h_l * x_c) + (h_l * x_s + h_l * x_c)) + h_l * x_c$$

Any perturbation in the $l^{th}$ must be translated to the other phases, however. Referring back to the frequency domain equation:

$$H_l X_c = GF f(h_l * x_s + h_l * x_c)$$

this can be similarly rewritten as:

$$H_l X_c = GFf(h_l * x_s + h_l * x_c) + GF(h_l * x_s + h_l * x_c) - GF(h_l * x_s + h_l * x_c)$$
$$= GF(f(h_l * x_s + h_l * x_c) - (h_l * x_s + h_l * x_c)) + GF(h_l * x_s + h_l * x_c)$$
$$= GF(f(h_l * x_s + h_l * x_c) - (h_l * x_s + h_l * x_c)) + H_l X_c$$

By multiplying each side of this equation by $H_m H_l^{-1}$:

$$H_m X_c = H_m H_l^{-1} GF(f(h_l * x_s + h_l * x_c) - (h_l * x_s + h_l * x_c)) + H_m X_c$$

The IDFT of this equation provides:

$$h_m * x_c = F^H H_m H_l^{-1} GF(f(h_l * x_s + h_l * x_c) - (h_l * x_s + h_l * x_c)) + h_m * x_c$$

or, for shaping function $S_{lm} := F^H H_m H_l^{-1} GF$:

$$h_m * x_c = S_{lm}(f(h_l * x_s + h_l * x_c) - (h_l * x_s + h_l * x_c)) + h_m * x_c$$

Shaping function $S_{lm}$ thus shapes the application of the clip from the $l^{th}$ phase to the update for the $m^{th}$ phase.

Figure 7:
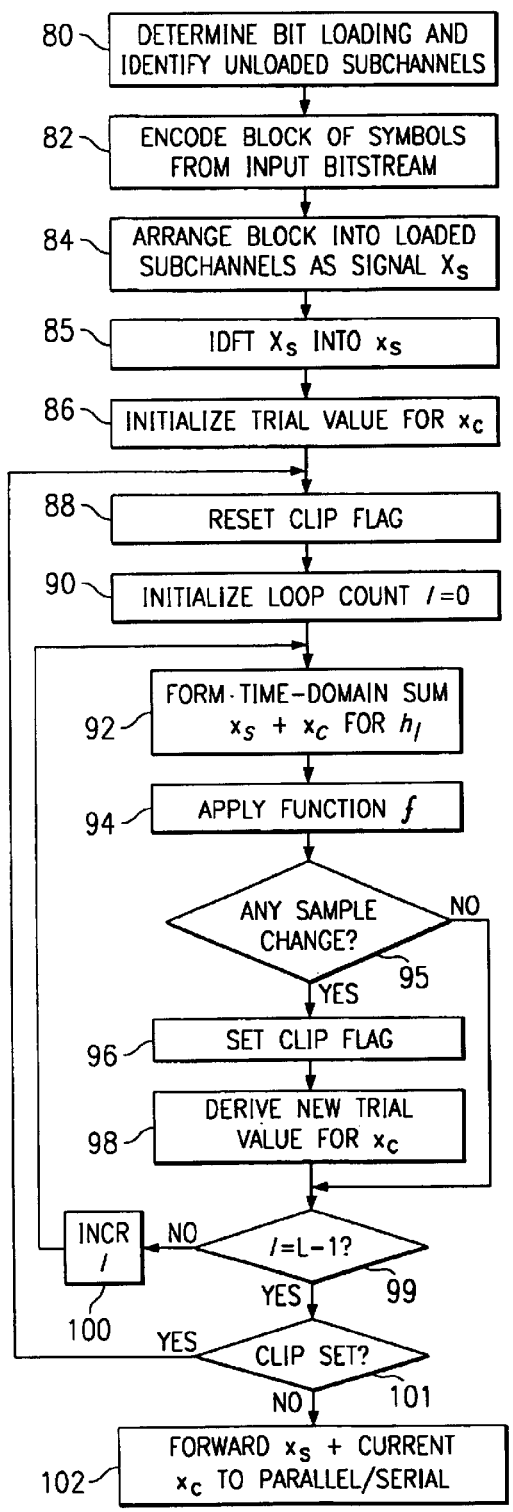
FIG. 7 is a flow diagram illustrating the operation of the second preferred embodiment of the invention in generating a clip prevention signal.
Figure 8:
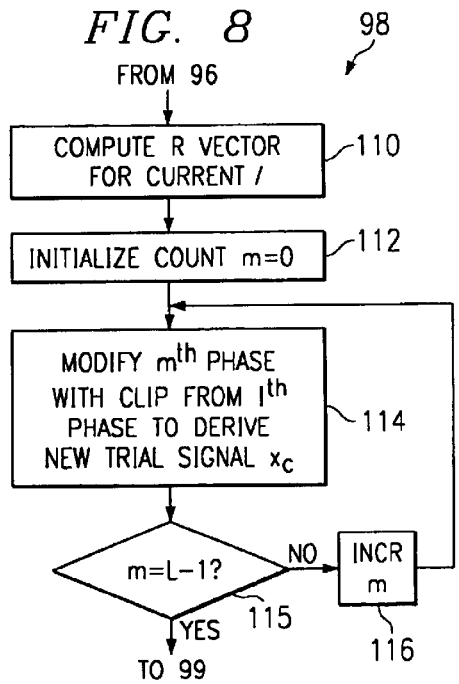
FIG. 8 is a flow diagram illustrating the process of updating a trial value of the clip prevention signal according to the second preferred embodiment of the invention as shown in FIG. 7.

Referring now to FIGS. 6 through 8, a method for effecting the encoding of unloaded subchannels in order to reduce the PAR according to a second preferred embodiment of the invention and following this time-domain update approach, will now be described in detail. As will be evident from the following description, this method is performed in a manner that takes upsampling function 15 and filter 16 into account.

FIG. 6 illustrates the communications process in which the data is transmitted and received according to this second embodiment of the invention, with the same reference numerals being used for the same functions as described above relative to FIG. 3. According to this second embodiment of the invention, however, encoding function 219 produces time-domain clip prevention signal $x_c$, which is applied into the signal stream at a point in time after the IDFT of payload signal $X_s$ is performed in IDFT function 12. Because of the orthogonality constraint of clip prevention signal $x_c$ relative to payload signal $x_s$, the subchannel frequencies corresponding to clip prevention signal $x_c$ will be different from those of payload signal $x_s$, and will correspond to the subchannel frequencies of the unloaded channels. As shown in FIG. 6, for example, clip prevention signal $x_c$ is applied to parallel-to-serial converter function 13, by way of which time-domain clip prevention signal $x_c$ is merged with time-domain payload signal $x_s$.

The method according to this second embodiment of the invention begins, as before, with the determination of the bit loading of the DMT subchannels, and the identifying of those subchannels receiving no bit loading, in process 80. As before, process 80 is preferably performed during the initialization of the DSL session. Process 82 then encodes a block of symbols from the input payload bitstream into multiple-bit symbols according to the corresponding symbol constellation (e.g., QAM) and associates these symbols with subchannels in the transmission band according to the bit loading of process 80, to produce payload signal $X_s(n)$.

In process 85, an IDFT routine is performed to transform the frequency domain payload signal $X_s$ into time domain signal $x_s$. This conversion corresponds to IDFT function 12, except of course that the unloaded subchannels have zero-valued components. In process 86, clip prevention signal $x_c$ is initialized to a first trial value, preferably zero (i.e., $x_c(n)=0$ for all n). Flag CLIP is reset in process 88, and loop counter l is initialized to zero in process 90.

In process 92, a time-domain sum is formed from the payload time domain signal $x_s$ and the current trial clip prevention signal $x_c$, for the phase of the polyphase representation of the upsampling and filter functions 15, 16 as shown in FIG. 4. This time domain signal is the simple sum of the signals $x_s$, $x_c$ incorporating their time domain filters for that phase:

$$h_l*x_s+h_l*x_c$$

This time domain sum signal is then processed, in process 94, by function $f$, which for example may be a hardlimiting amplifier characteristic as discussed above.

Decision 95 is then performed to determine whether any samples in the sum time-domain signal had their amplitude modified by clipping process 94. If not, control passes to decision 99, in which the loop counter l is compared against the terminal value of L−1 to determine whether all L phases of the representation have been considered. If not (decision 99 is NO), loop counter l is incremented in process 100, and the process is repeated for the next phase, from process 92.

If one or more sample amplitudes did change (decision 95 is YES), then some sample amplitudes of the sum of the payload signal $x_s$ and the current trial clip prevention signal $x_c$ exceeded the clipping threshold of the nonlinear function applied in process 94, requiring an adjustment in clip prevention signal $x_c$. Flag CLIP is set in process 96, indicating that the clipping occurred. The trial value of clip prevention signal $x_c$ is then adjusted in process 98. As discussed above in connection with the theory of operation of this second preferred embodiment of the invention, in this time domain update approach, an adjustment to clip prevention signal $x_s$, due to one phase of the polyphase representation will also affect the other phases. Adjustment process 98 is performed so that these effects are also applied to the other phases, as will now be described relative to FIG. 8.

In process 110, a vector R is determined for the current phase. Vector R is used repeatedly, for each phase in the polyphase representation, and therefore it is beneficial to calculate it only once, as performed in process 110 in this embodiment of the invention. According to this embodiment of the invention, vector R is derived as:

$$R=f(h_l*x_s+h_l*x_c)-(h_l*x_s+h_l*x_c)$$

Phase count m is then initialized to zero in process 112.

In process 114, the $m^{th}$ phase of clip prevention signal $x_c$ is modified according to the clipping effects from the $l^{th}$ phase that were detected in process 94 and decision 95. Recalling the shaping function $S_{lm}$:

$$S_{lm}=:F^HH_mH_l^{-1}GF$$

using indicator matrix G as determined in process 80, the adjustment to clip prevention signal $x_c$ is updated for the $m^{th}$ phase, based on the clipping in the $l^{th}$ phase, by:

$$h_l*x_c=S_{lm}R+h_l*x_c$$

which is performed in process 114. Decision 115 determines if clip prevention signal $x_c$ is to be adjusted in any more phases, by interrogating whether count m has yet reached the terminal value of L−1. If not (decision 115 is NO), count m is incremented in process 116, and clip prevention signal $x_c$ is adjusted for the next phase. If so (decision 115 is YES), then clip prevention signal $x_c$ has been adjusted in each of the phases, for the clipping effects upon the current phase (l), and control passes to decision 99.

Decision 99 determines whether the loop count l has reached the terminal value of L−1, and thus determined whether the current trial value of clip prevention signal $x_c$ has been evaluated for all phases. If so (decision 99 is YES), decision 101 then interrogates flag CLIP to determine if the trial value of clip prevention signal $x_c$ caused any clipping. If so (decision 101 is YES), the current value of clip prevention signal $x_c$ must now be evaluated, beginning with the resetting of flag CLIP, initializing of loop count l, and repeating of the sequence of operations beginning with process 92.

Upon an evaluation of a trial value of clip prevention signal $x_c$ that does not result in any clipping (decision 101 is NO), the routine is complete. The current clip prevention signal $x_c$ is thus adequate to avoid clipping by reduction of the PAR using unloaded subchannels, in which case the current sum time domain signal $x_s+x_c$ can be forwarded to parallel-to-serial conversion function 13 (FIG. 3), from which the transmission process continues.

This second embodiment of the invention, as in the first embodiment, provides the important advantages of reducing the PAR and thus reducing clipping of the transmitted signal, without any loss of data and while maintaining a reasonable average power so that downstream amplifiers can operate efficiently. It is also contemplated that the time domain update approach of this second embodiment of the invention will provide additional efficiency and performance in many applications, considering that only a single IDFT operation need be performed for a given block of data, because the derivation and updating of the clip prevention signal is performed in the time domain, after the IDFT of the payload signal, with no repeated IDFT processes being performed.

In addition, according to both of these disclosed embodiments of the invention, no operations are required on the part of the receiving modem, because only the unloaded subchannels are affected by the clip prevention signal, and these subchannels are necessarily ignored by the receiving modem. Accordingly, the PAR reduction accomplished by this invention can be performed at the transmitter, transparently to the receiving modem circuitry.

The preferred embodiments of the invention, as described above, are directed to the modulation of signals according to the Fourier transform (i.e., the IDFT/DFT, or IFFT/FFT, transform pairs), which is an invertible orthogonalizing transform. It is contemplated that this invention may also be applied to, and be of benefit in connection with, any orthogonalizing transform, many types of which are well known in the art.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of modulating digital signals for transmission over a communications facility, comprising the steps of:

bit loading of a plurality of subchannels;

identifying at least one of the plurality of subchannels that is unloaded;

receiving a payload bitstream;

encoding the received payload bitstream into a plurality of symbols, the symbols each associated with one of the plurality of subchannels, the plurality of symbols arranged as a digital payload signal;

for each of a plurality of phases corresponding to an upsampling function, forming a time-domain sum signal of the payload signal and a trial clip prevention signal, the trial clip prevention signal being orthogonal to the payload signal and associated with the at least one unloaded subchannel, and the trial clip prevention and payload signals having been filtered by a filter associated with the current phase;

applying a function to the sum signal to derive a clipped sum signal;

responsive to the clipped sum signal differing from the sum signal, modifying the trial clip prevention signal for the current phase;

repeating the forming, applying, and modifying steps for each of the plurality of phases;

responsive to the clipped sum signal having differed from the sum signal for each of the plurality of phases, repeating the forming, applying, and modifying steps for the plurality of phases; and responsive to the clipped sum signal not differing from the sum signal over all of the plurality of phases, processing a sum of the payload signal and the current trial clip prevention signal.

2. The method of claim 1, wherein the forming step comprises: performing an Inverse Discrete Fourier Transform (IDFT) on each of the payload and current trial clip prevention signal, each signal modified by a filter response for the current phase; and adding the IDFT's from the performing step to produce the sum signal.

3. The method of claim 2, further comprising:

deriving an indicator matrix that has non-zero entries along a diagonal at locations corresponding to unloaded subchannels, and zero-valued entries elsewhere;

and wherein the modifying step comprises:

applying an operator, corresponding to the indicator matrix and an inverse of the filter for the current phase, to the clipped sum signal to derive the modified trial clip prevention signal.

4. The method of claim 3, wherein the processing step comprises:

modulating a sum of the payload signal and the current trial clip prevention signal by performing an Inverse Discrete Fourier Transform.

5. The method of claim 4, wherein the processing step comprises:

after the modulating step, formatting the modulated signal into a time domain digital sequence;

upsampling the time domain digital sequence by a factor corresponding to the plurality of phases;

filtering the upsampled digital sequence;

converting the filtered upsampled digital sequence to an analog signal; and amplifying the analog signal.

6. The method of claim 1, wherein the forming step comprises: performing an Inverse Discrete Fourier Transform (IDFT) on the payload signal; applying a filter response for the current phase to the IDFT of the payload signal; adding the trial clip prevention signal, in a time domain form and after applying the filter response for the current phase thereto, to the payload signal after the applying step.

7. The method of claim 6, wherein the modifying step comprises:

computing a vector corresponding to the current phase; and for each of the plurality of phases, modifying the trial clip prevention signal with the clipped sum signal for the current phase.

8. The method of claim 7, wherein the step of modifying the trial clip prevention signal with the clipped sum signal for the current phase comprises:

applying a shaping function to the vector, and adding the result to the trial clip prevention signal filtered by the filter response for the phase.

9. The method of claim 8, wherein the processing step comprises:

upsampling the sum of the payload signal and the clip prevention signal by a factor corresponding to the plurality of phases;

filtering the upsampled sum signal;

converting the filtered upsampled sum signal to an analog signal; and amplifying the analog signal.

10. A transceiver for transmitting Discrete Multitone (DMT) modulated signals, comprising:

an analog front end function, coupled on one side to a communications facility;

an interface, for interfacing the transceiver to a data source; and programmable logic circuitry, coupled to the interface and to the analog front end function, for modulating a digital payload bitstream from the data source and applying the modulated signal to the analog front end function, by executing an instruction routine to perform a sequence of operations comprising:

bit loading a plurality of subchannels;

identifying at least one of the plurality of subchannels that is unloaded;

receiving the payload bitstream;

encoding the received payload bitstream into a plurality of symbols, the symbols each associated with one of the plurality of subchannels, the plurality of symbols arranged as a digital payload signal;

for each of a plurality of phases corresponding to an upsampling function, forming a time-domain sum signal of the payload signal and a trial clip prevention signal, the trial clip prevention signal being orthogonal to the payload signal and associated with the at least one unloaded subchannel, and the trial clip prevention and payload signals having been filtered by a filter associated with the current phase;

applying a function to the sum signal to derive a clipped sum signal;

responsive to the clipped sum signal differing from the sum signal, modifying the trial clip prevention signal for the current phase;

repeating the forming, applying, and modifying steps for each of the plurality of phases;

responsive to the clipped sum signal having differed from the sum signal for each of the plurality of phases, repeating the forming, applying, and modifying steps for the plurality of phases; and responsive to the clipped sum signal not differing from the sum signal over all of the plurality of phases, processing a sum of the payload signal and the current trial clip prevention signal and forwarding the processed signal to the analog front end function.

11. The transceiver of claim 10, wherein the programmable logic programmed to perform the forming step by: performing an Inverse Discrete Fourier Transform (IDFT) on each of the payload and current trial clip prevention signal, each signal modified by a filter response for the current phase; and adding the IDFT's from the performing step to produce the sum signal.

12. The transceiver of claim 11, wherein the programmable logic is programmed to perform the step of:
  deriving an indicator matrix that has non-zero entries along a diagonal at locations corresponding to unloaded subchannels, and zero-valued entries elsewhere;
  and wherein the programmable logic is programmed to perform the modifying step by:
  applying an operator, corresponding to the indicator matrix and an inverse of the filter for the current phase, to the clipped sum signal to derive the modified trial clip prevention signal.

13. The transceiver of claim 12, wherein the programmable logic performs the processing step by a sequence of operations comprising:
  modulating a sum of the payload signal and the current trial clip prevention signal by performing an Inverse Discrete Fourier Transform;
  after the modulating step, formatting the modulated signal into a time domain digital sequence;
  upsampling the time domain digital sequence by a factor corresponding to the plurality of phases;
  filtering the upsampled digital sequence;
  converting the filtered upsampled digital sequence to an analog signal;
  amplifying the analog signal; and
  applying the amplified analog signal to the analog front end function.

14. The transceiver of claim 10, wherein the programmable logic is programmed to perform the forming step by: performing an Inverse Discrete Fourier Transform (IDFT) on the payload signal; applying a filter response for the current phase to the IDFT of the payload signal; adding the trial clip prevention signal, in a time domain form and after applying the filter response for the current phase thereto, to the payload signal after the applying step.

15. The transceiver of claim 14, wherein the programmable logic is programmed to perform the modifying step by:
  computing a vector corresponding to the current phase; and
  for each of the plurality of phases, applying a shaping function to the vector, and adding the result to the trial clip prevention signal filtered by the filter response for the phase.

16. The transceiver of claim 15, wherein the programmable logic is programmed to perform the processing step by:
  upsampling the sum of the payload signal and the clip prevention signal by a factor corresponding to the plurality of phases;
  filtering the upsampled sum signal;
  converting the filtered upsampled sum signal to an analog signal; and
  amplifying the analog signal.

17. The transceiver of claim 10, wherein the programmable logic is a digital signal processor.

18. A method of processing a payload signal to avoid clipping, comprising the steps of:
  encoding the payload signal into a plurality of symbols, the symbols each associated with one of a plurality of subchannels, the plurality of subchannels including at least one unloaded subchannel for which none of the encoded symbols of the payload signal are associated;
  for each of a plurality of phases corresponding to an upsampling function, forming a time-domain sum signal of the payload signal and a trial clip prevention signal, the trial clip prevention signal being orthogonal to the payload signal and associated with the at least one unloaded subchannel, and the trial clip prevention and payload signals having been filtered by a filter associated with the current phase;
  applying a function to the sum signal to derive a clipped sum signal;
  responsive to the clipped sum signal differing from the sum signal, modifying the trial clip prevention signal for the current phase;
  repeating the forming, applying, and modifying steps for each of the plurality of phases;
  responsive to the clipped sum signal having differed from the sum signal for each of the plurality of phases, repeating the forming, applying, and modifying steps for the plurality of phases; and
  responsive to the clipped sum signal not differing from the sum signal over all of the plurality of phases, processing a sum of the payload signal and the current trial clip prevention signal.

19. The method of claim 18, wherein the forming step comprises:
  performing an inverse orthogonalizing transform on each of the payload and current trial clip prevention signal, each signal modified by a filter response for the current phase; and
  adding the transforms from the performing step to produce the sum signal.

20. The method of claim 19, further comprising:
  deriving an indicator matrix that has non-zero entries along a diagonal at locations corresponding to unloaded subchannels, and zero-valued entries elsewhere;
  and wherein the modifying step comprises:
  applying an operator, corresponding to the indicator matrix and an inverse of the filter for the current phase, to the clipped sum signal to derive the modified trial clip prevention signal.

21. The method of claim 20, wherein the orthogonalizing transform is a Fourier transform:
  and wherein the processing step comprises:
  modulating a sum of the payload signal and the current trial clip prevention signal by performing an Inverse Discrete Fourier Transform.

22. The method of claim 18, wherein the forming step comprises:
  performing an inverse orthogonalizing transform on the payload signal;
  applying a filter response for the current phase to the transform of the payload signal;
  adding the trial clip prevention signal, in a time domain form and after applying the filter response for the current phase thereto, to the payload signal after the applying step.

23. The method of claim 22, wherein the modifying step comprises:
  computing a vector corresponding to the current phase; and
  for each of the plurality of phases, modifying the trial clip prevention signal with the clipped sum signal for the current phase.

24. The method of claim 23, wherein the step of modifying the trial clip prevention signal with the clipped sum signal for the current phase comprises:
  applying a shaping function to the vector, and adding the result to the trial clip prevention signal filtered by the filter response for the phase.

* * * * *